United States Patent [19]

Coupland

[11] 4,143,924
[45] Mar. 13, 1979

[54] LOAD-SENSING VALVES

[75] Inventor: Ralph Coupland, Lincoln, England

[73] Assignee: Clayton Dewandre Company Limited, Lincoln, England

[21] Appl. No.: 776,670

[22] Filed: Mar. 11, 1977

[30] Foreign Application Priority Data

Apr. 2, 1976 [GB] United Kingdom ............... 13458/76

[51] Int. Cl.² .............................................. B60T 8/18
[52] U.S. Cl. ................................... 303/22 R; 188/195
[58] Field of Search ........... 188/195; 303/22 A, 22 R, 303/23 R; 137/630.15, 630.14

[56] References Cited

U.S. PATENT DOCUMENTS

| | | | |
|---|---|---|---|
| 2,099,428 | 11/1937 | Logan, Jr. ...................... | 303/22 R X |
| 3,330,604 | 7/1967 | Schultz et al. .................... | 303/22 R |
| 3,631,894 | 1/1972 | Frantz ............................. | 137/630.15 |
| 3,862,782 | 1/1975 | Horowitz et al. ...................... | 303/40 |

FOREIGN PATENT DOCUMENTS 324629 2/1935 Italy ....................................... 303/22 R

*Primary Examiner*—George E. A. Halvosa
*Attorney, Agent, or Firm*—Norris & Bateman

[57] ABSTRACT

A load-sensing valve for an air pressure braking system comprises a diaphragm responsive to a signal pressure, as from a brake valve, and actuating through a rockable beam a two stage valve for controlling flow of pressure air to the brakes, the beam fulcrum being displaceable in accordance with vehicle load, and a further diaphragm having operable connection with the two-stage valve and responsive to delivery pressure, the two-stage valve consisting of a pilot valve operable alone where air usage is small to provide high sensitivity and a main inlet valve which is brought into operation with increased inlet pressure and larger air flow.

7 Claims, 3 Drawing Figures

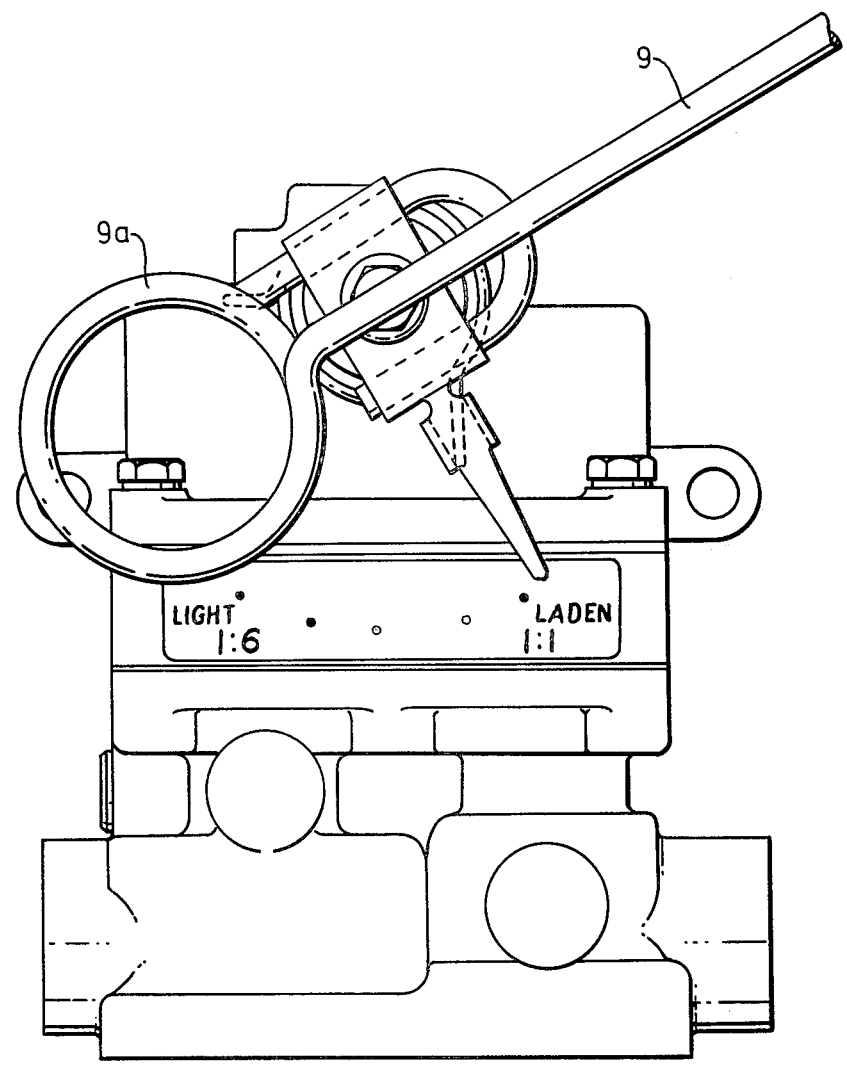

LOAD-SENSING VALVES

This invention relates to load-sensing valves for use in air pressure braking systems of motor vehicles for regulating the braking pressure in accordance with vehicle load and has particular reference to valves of a kind in which a member displaceable by a signal pressure, usually from a brake valve, actuates through a beam valve means operable to control flow of pressure air to the brakes, means being provided responsive to vehicle load for displacing the fulcrum of the beam to modify the effective leverage thereof.

The object of the present invention is to provide an improved load-sensing valve of the kind above-mentioned which is highly sensitive to small load variations whilst still dealing competently with larger load variations and which, by the use of diaphragms as the pressure-responsive members, avoids the use of sealing rings and similar seals usually associated with pistons and plungers.

According to the invention the improved load-sensing valve comprises a diaphragm responsive to a signal pressure having operative connection with one arm of a beam, a two-stage valve assembly controlling communication between an inlet port for connection to a flow of pressure air and a delivery port for connection to brake actuators, means providing an operative connection between said valve assembly and the other arm of the beam and supported by a further diaphragm responsive to pressure in said delivery port, and means for displacing the fulcrum of the beam in accordance with variations in vehicle load.

Preferably the two-stage valve assembly comprises a pilot valve, which operates alone where only small air usage is concerned and which provides a high degree of sensitivity, and a main valve which is also brought into operation when larger volumes of air are required and such a load-sensing valve will now be described in more detail with reference to the accompanying drawings wherein:

FIG. 3 is a side elevation viewed from the right of FIG. 2.

Figure 1:
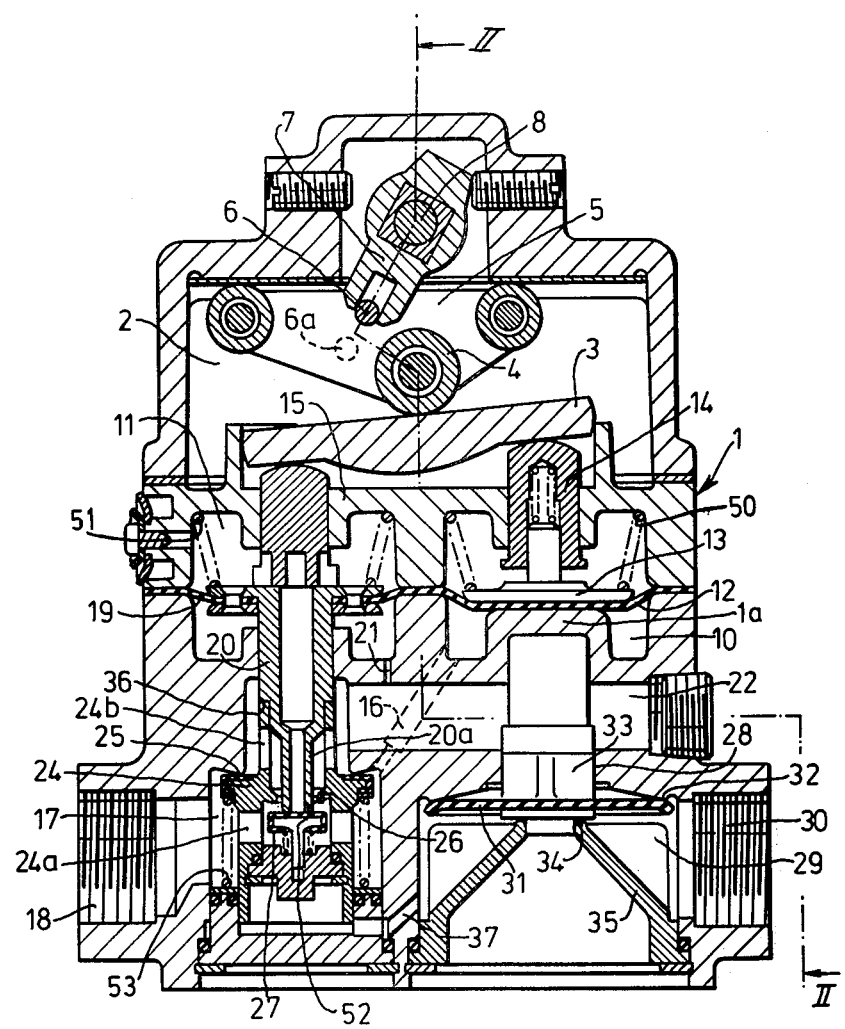
FIG. 1 is a cross section view of the valve.
Figure 2:
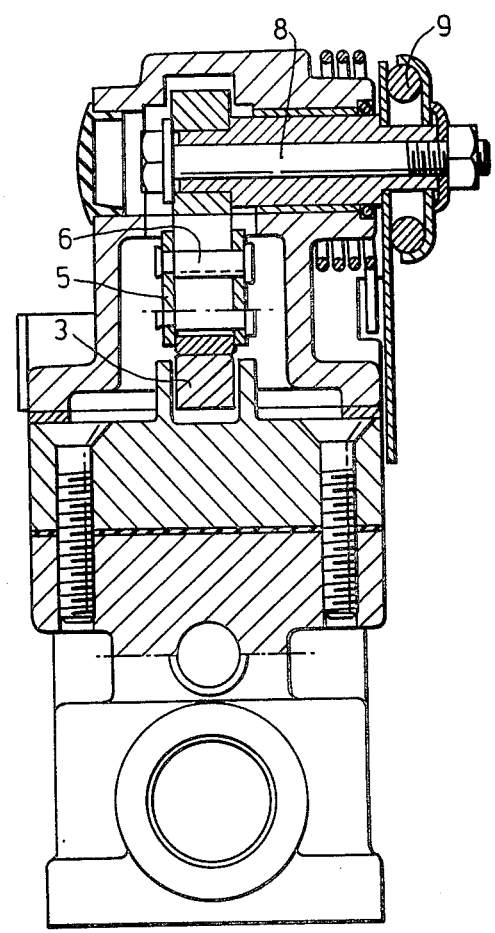
FIG. 2 is a part-sectional view on the line II—II of FIG. 1.

The valve shown comprises a body or housing indicated generally at 1 and defining at its upper end a chamber 2 accommodating a transversely-disposed beam 3, a roller 4 constituting the beam fulcrum bearing against the upper side of the beam intermediate its ends and being carried by a slide 5 movable transversely within the said chamber. A pin 6 on the slide is engaged by a forked arm 7 carried by a spindle 8 journaled in the housing and extending at right angles to the slide, an arm 9 which incorporates a coiled spring 9a being secured to the spindle 8 and being oscillated relative to the housing 1 under changes of vehicle load whereby the slide is displaced and the ratio of the beam arms varied in accordance with said changes of vehicle load.

Formed in the housing below the beam chamber 2 is a pair of side-by-side diaphragm chambers 10, 11, respectively, in the first of which is a transversely-disposed spring-loaded inlet diaphragm 12 engaged by a plate 13 carrying a telescopic stud structure 14 which extends through a transverse wall 15 of the housing and into abutment with one end of the beam 3. The space above the diaphragm 12 is vented to atmosphere whilst the space below the diaphragm communicates via a restricted passage indicated diagrammatically at 16 with a valve chamber 17 disposed below the diaphragm chamber 11 and in permanent communication with an inlet port 18 connected in use to the brake valve of the associated braking system. A transversely-disposed reaction diaphragm 19 in the diaphragm chamber 11 is attached to a vertically-disposed hollow valve-actuating plunger 20, the upper end of which also extends through the transverse wall 15 and into abutment with the other end of the beam. The space above the diaphragm 19 is also vented to atmosphere whilst the space below said diaphragm communicates via a restricted passage 21 with an outlet passage 22 connected in use to the brakes as hereafter described.

Disposed in the valve chamber 17 is a two-stage valve assembly comprising a tubular poppet-type inlet valve element 24 co-operating with a fixed annular seating 25 and itself providing an annular seating 26 for a second pilot poppet valve member 27 accommodated within a chamber in the tubular valve element 24, the walls of the valve element 24 have radial ports 24a therein and both inlet and pilot valves being spring urged towards their respective seatings. The lower end of the plunger 20 is guided for axial movement within a ported tubular extension 24b of the inlet valve element 24, the plunger being provided with a hollow extension 20a constituting a valve-actuating element and operable on displacement of the plunger to engage and move the pilot valve member 27 off its seating 26. The bore of the plunger and of its extension constitutes an exhaust passage by opening at its upper end into the chamber 11 above the diaphragm 19.

As shown in the drawing the plunger, inlet valve element and pilot valve element are coaxial.

At the delivery side of the valve the passage 22 opens by way of a vertical bore 28 in the valve body into a chamber 29 in permanent communication with a delivery port 30 adapted in use to be connected to the associated brake actuators. Flow of air under pressure to the delivery port is controlled by a flexible disc valve element 31 co-acting at its upper side and near its periphery with a fixed seating 32 and secured at its centre to a fluted boss 33 guided for axial movement in the bore 28. The valve element 31 also acts as a quick release exhaust valve for which purpose it is adapted to co-operate on its underside with a further annular seating 34 formed on a tubular fitting 37 which opens to atmosphere at its lower side, the arrangement being such that when the valve assembly admits air to passage 22, the air deflects the peripheral portion of disc valve element 31 and flows to the delivery port 30, whilst on the venting of pressure in the passage 22 by the valve assembly the residual pressure in the brake actuators and associated conduits lifts the disc valve element from the seating 34 so effecting rapid release of the brakes. The diaphragm 12 is normally held by a spring 50 against a stop 1a on the body whilst the diaphragm 19 is loaded by a spring 51 which, acting through the plunger 20, causes the exhaust seating 52 on the lower end of the plunger extension to engage the pilot valve member 27 and hold the latter off its seating 26 as shown in FIG. 1. In this position a shoulder 36 on the plunger abuts the upper end of the inlet valve extension 24b but the loading of spring 51 is not sufficient to open the inlet valve 24 against its loading spring 53. When the brake valve is actuated pressure air delivered initially and via port 18 to valve chamber 17 flows past the open pilot valve 27 and its seating 26 to passage 22 and thence past seat 32 to the delivery port 30. Air also passes through the restricted passages 16 and 21 to the spaces beneath diaphragms 12 and 19 respectively and pressure continues to rise until the diaphragm load equals the fitted load of springs 50, 51. At this point plunger 20 will rise and the pilot valve 27 will move to a lap position. In this manner the spring loading of the two diaphragms provides a constant tare pressure which is normally at around 5 p.s.i. With small air usage only the pilot valve member will be operative to give maximum sensitivity but with a further rise in pressure at the inlet port 18 calling for a larger air flow the increased pressure acting on the underside of inlet diaphragm 12 will lift said diaphragm and, through stud 14, rock the beam 3 to depress the plunger 20 and open the inlet valve 24. Here also the inlet valve 24 assumes a lap condition to hold the brake actuators operative at the desired braking pressure until the brake valve resumes its inoperative condition or until braking pressure is further increased. Variations in vehicle load will result in the fulcrum roller 4 moving along the beam and by so doing varying the ratio of beam arms to vary the output pressure relative to the input pressure. The slide 5 may provide an alternative mounting position 6a for the pin 6 to give a reduced lever angle and modified load setting.

The housing includes a drilling 37 connecting the chamber 29 and delivery port 30 with the valve chamber 17 beneath the inlet valve element 24 to provide output pressure balance across the inlet valve, the valve element being thus balanced for both inlet and output pressures.

I claim:

1. A load-sensing valve for use in an air pressure braking system for a vehicle and including an inlet port for connection to a source of air pressure and a delivery port for connection to the vehicle brake actuators, comprising a rockable beam having a fulcrum, first fluid pressure responsive diaphragm means operatively connected to one arm of said beam, second fluid pressure responsive diaphragm means operatively connected to the other arm of said beam, a two-stage valve assembly arranged for controlling communication between said inlet and delivery ports; said two-stage valve assembly comprising a movably mounted hollow inlet valve element coacting with a fixed seating, a pilot valve element coaxially and movably mounted within said hollow inlet valve element and coacting with a seating in said hollow inlet valve element, and a plunger coaxial with said valve elements attached to said second fluid pressure responsive diaphragm means, said plunger having a longitudinally movable connection with said inlet valve element and having a part extending through said inlet valve element for operative connection to said pilot valve element, a first resilient means for biasing said inlet valve element onto its seating, a second resilient means for biasing said plunger into a motion transmitting connection with said inlet valve element and to displace and normally hold said pilot valve element off its seating under conditions of small or no brake operating air pressure, said first resilient means being of sufficiently greater strength than said second resilient means that said inlet valve element is not displaced from its seating by the force of said second resilient means, means operative when brake operating air pressure is effective through said inlet port for supplying air pressure at inlet pressure to said first diaphragm means and air pressure at delivery pressure to said second diaphragm means, means in the connection between said plunger and said valve elements whereby when said brake operating air pressure is below a predetermined value said inlet valve element remains seated while said pilot valve element remains open whereas when said brake operating air pressure exceeds said predetermined value said plunger is displaced by said beam and moves said inlet valve element off its seating, and means for displacing said fulcrum in response to variations in vehicle load.

2. A load-sensing valve as claimed in claim 1, wherein said first pressure responsive diaphragm means extends across a diaphragm chamber, one side of the diaphragm being vented to atmosphere while the space at the other side of the diaphragm is connected by a restricted passage to the inlet side of the valve assembly.

3. A load-sensing valve as claimed in claim 1, wherein said diaphragm means are both spring loaded in such manner that the valve provides a constant tare pressure, preferably at around 5 p.s.i.

4. A load-sensing valve as claimed in claim 1, wherein flow of air from the delivery side of the valve assembly to the delivery port is controlled by a check valve comprising a flexible disc type valve element, said disc type valve element also co-acting with a seating on an exhaust structure to provide rapid exhaustion of the connected brake actuators upon release of the braking pressure.

5. A load-sensing valve as claimed in claim 1, wherein the beam fulcrum is carried by a displaceable slide and the movements of an arm which is oscillated relative to the valve under variations in vehicle load are transmitted to the slide through a pin means and fork connection.

6. A load-sensing valve as defined in claim 5, wherein said pin means has alternative mounting positions whereby to provide modified load settings.

7. A load-sensing valve as claimed in claim 1 wherein said second resilient means is in a chamber at the side of said second diaphragm means that is not exposed to air pressure at delivery pressure, said chamber is vented to atmosphere and said plunger is hollow whereby to provide an exhaust passage to said chamber normally closed by engagement of said plunger with said pilot valve element.

* * * * *